UNITED STATES PATENT OFFICE.

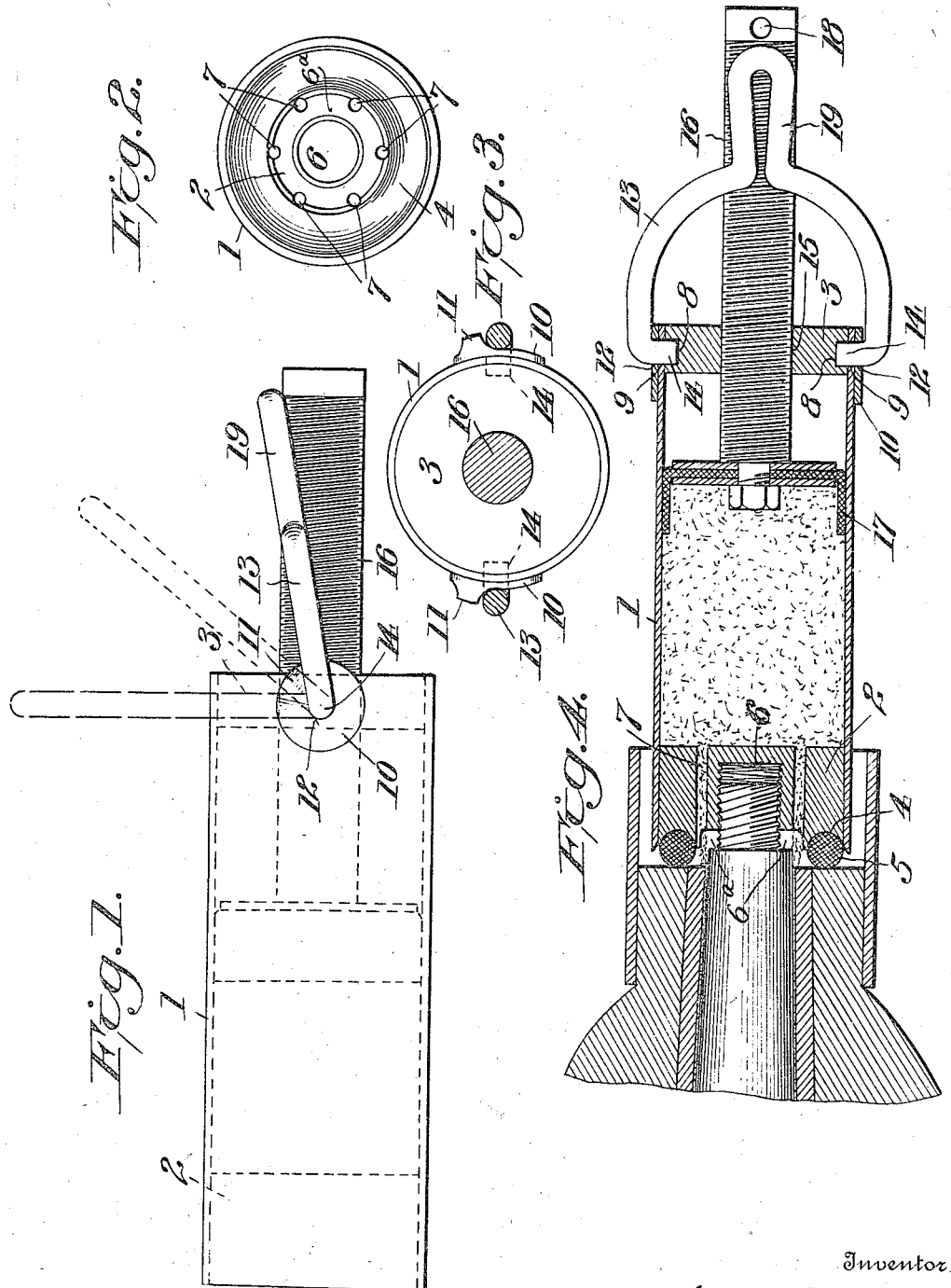

THOMAS L. STROUD, OF FORT MYER, VIRGINIA, ASSIGNOR OF ONE-THIRD TO GEORGE B. MULLIN AND ONE-THIRD TO JOHN L. McLUCAS, OF WASHINGTON, DISTRICT OF COLUMBIA.

LUBRICATOR.

1,127,309.  Specification of Letters Patent.  Patented Feb. 2, 1915.

Application filed June 3, 1913. Serial No. 771,410.

*To all whom it may concern:*

Be it known that I, THOMAS L. STROUD, a citizen of the United States, residing at Fort Myer, in the county of Alexandria and State of Virginia, have invented certain new and useful Improvements in Lubricators, of which the following is a specification.

This invention relates to new and useful improvements in lubricators, and especially to lubricators that can be readily attached to heavy draft vehicles, particularly wagons, gun carriages and the like. The construction of my invention is such that it can be attached to any and all of the spindles of a wagon, and lubricate the axle thereof, without removing the wheel therefrom.

The main object of this invention is to provide a lubricator that can be cheaply constructed, and attached to wagon axles of ordinary or usual construction without any alterations thereof.

This invention is illustrated in the accompanying drawings, which form a part of this specification and in which, Figure 1 is a side elevation of my invention. Fig. 2 is an end view showing the end that is attached to the axle. Fig. 3 is an end view of the opposite end of the invention. Fig. 4 is a sectional view showing my invention attached to the end of a wagon axle.

Similar characters of reference designate corresponding parts in the several figures of the drawing.

Referring to the drawings the numeral 1 represents a cylinder having a head 2 at one end and a removable head 3 at the other end. The cylinder is designed to be filled with a suitable lubricant for greasing axles of vehicles. The face of the head 2 is formed with a groove 4 forming a seat for a ring washer 5 and a central socket or recess 6 formed with right and left hand internal threads, for the purpose of adapting the same to be screwed onto either end of a spindle. The head 2 is also formed with a plurality of longitudinal perforations 7 for a purpose presently set forth, and with a recess 6ª surrounding the socket 6. The recess 6ª is designed to afford space to receive the spindle shoulders in cases where the shoulders of the axle have become worn to such an extent as to permit the wheel hub to work back on the spindle and prevent a tight joint. In such cases the head 2 may be screwed up tighter to make the joint and its recess 6ª will receive the shouldered end of the spindle.

The removable head 3 of the cylinder 1 is formed with oppositely disposed recesses 8 in its periphery, which register with perforation 9 in the cylinder 1. The cylinder is reinforced around the opening 9 by plates 10, having a cam surface 11 for a purpose hereinafter described, said plates 10 being formed with openings 12, which register with the openings 9 and the recesses 8.

A spring handle 13 in the form of a bail, with inturned ends 14 is designed to hold the removable head 3 in the end of the cylinder 1, the ends 14 of the handle passing through the openings 12, perforations 9, and into the recesses 8, as clearly shown in Figs. 1 and 4.

The head 3 is provided with a central internally threaded opening 15, in which a screw threaded piston rod 16 operates, and which piston rod operates an ordinary cup piston 17 for forcing the lubricating material through the perforations 7 of the head 2 of the cylinder, and onto the spindle of the axle.

The outer end of the piston rod is formed with an opening 18, to receive a bar or any other convenient means to form a handle for turning the rod.

In order to remove the head 3 for the purpose of supplying the cylinder with the lubricant the handle 13 is moved or turned so as to ride on the cams 11 and into the position shown in dotted lines, in Fig. 1, thereby forcing the ends 14 out of the recesses 8 of the head. The head may then be removed by drawing on the piston rod.

The handle 13 is formed with an extension 19, so that when the handle is in the position shown in broken lines in Fig. 1, it may be used to assist in tightening the lubricator in place in order to compress the washer 5 and make a tight joint.

The operation of my invention is as follows: The lubricator filled with the proper material is screwed on the end of an axle spindle, and the handle when in the position shown in broken lines in Fig. 1 of the drawings, may be used as a lever handle to rotate the lubricator to make a tight joint between the washer and hub of the wheel. After the device is secured in place the piston rod is rotated, forcing the piston inward and the lubricating material through the perforations in the head and around the spindle.

Having thus fully described my invention, what I claim as new, and desire to secure by Letters Patent is:

1. An axle lubricator, comprising a reservoir for the lubricant, a socketed head having longitudinally extending perforations surrounding the socket, said socket being formed with right and left hand screw-threads, whereby the reservoir may be secured to either end of an axle, and means operating longitudinally of said reservoir for forcing lubricant through said longitudinal perforations.

2. An axle lubricator, comprising a reservoir for the lubricant, a socketed head having longitudinal perforations therethrough for closing one end of said reservoir, and said socket being formed with right and left hand screw-threads, a removable head closing the other end of said reservoir, and a piston on said rod for forcing the lubricant through said perforations.

3. An axle lubricator, comprising a reservoir for the lubricant, a head having a central screw threaded opening therethrough for closing one end of said reservoir, a threaded piston rod operating through said head and carrying a piston, a socketed head having longitudinal perforations for the other end of said reservoir, said socket being formed with right and left hand screw-threads to adapt the same to either end of the axle, and a packing surrounding said socket.

4. An axle lubricator comprising a lubricant reservoir having suitable discharge openings at its inner end and diametrically opposite orifice near its outer end, a piston head, a head in the outer end of the reservoir having a central threaded opening, and provided with recesses in its periphery adapted to be brought into register with the orifices in the reservoir, a lever handle having trunnion ends normally held seated in said orifices and recesses, and means whereby said trunnions may be withdrawn from the recesses while retained in the openings.

5. An axle lubricator comprising a lubricant reservoir having suitable discharge openings at its inner end and diametrically opposite orifices near its outer end, a piston, a piston rod, a head in the outer end of the reservoir having a central threaded opening, and provided with recesses in its periphery adapted to be brought into register with the orifices in the reservoir, a lever handle having trunnion ends normally held seated in said orifices and recesses, and means whereby said trunnions may be withdrawn from the recesses while retained in the orifices, said means comprising reinforcing plates around said orifices having cam surfaces over which said lever may ride when turned on its ends as pivots.

6. A lubricator comprising a cylinder, a head with perforations at one end of the cylinder, a removable head at the opposite end of said cylinder; a lever handle for holding the removable head in position and mechanical means for automatically releasing the removable head when said handle is raised to a given position.

7. A lubricator, comprising a cylinder, a removable head for said cylinder, means for securing said head in position, said means comprising a bent handle having its ends engaging said head, and means for spreading the ends of said handle to release said head.

8. A lubricator comprising a cylinder, a perforated head having a threaded socket for the discharge end of said cylinder, a groove formed in the end of said head, and a recess formed in the end of said head, said recess being located between said groove and socket.

In testimony whereof I have affixed my signature in presence of two witnesses.

THOMAS L. STROUD.

Witnesses:
WALLACE J. HILL,
RAE SIEGEL.